US012798407B2

(12) United States Patent
Böhler et al.

(10) Patent No.: US 12,798,407 B2
(45) Date of Patent: Nov. 17, 2026

(54) VEHICLE MODULE AND/OR GROUND MODULE FOR AN INDUCTIVE VEHICLE CHARGING SYSTEM

(71) Applicant: BRUSA Elektronik AG, Buchs (CH)

(72) Inventors: Lukas Böhler, Buchs (CH); Martin Weber, Buchs (CH)

(73) Assignee: BRUSA ELEKTRONIK AG, Buchs (CH)

( * ) Notice: Subject to any disclaimer, the term of this patent is extended or adjusted under 35 U.S.C. 154(b) by 0 days.

(21) Appl. No.: 19/160,932

(22) PCT Filed: Mar. 7, 2024

(86) PCT No.: PCT/EP2024/056063

§ 371 (c)(1),
(2) Date: Aug. 29, 2025

(87) PCT Pub. No.: WO2024/184478

PCT Pub. Date: Sep. 12, 2024

(65) Prior Publication Data

US 2026/0241811 A1 Aug. 20, 2026

(30) Foreign Application Priority Data

Mar. 8, 2023 (DE) ..................... 10 2023 105 711.1

(51) Int. Cl.
*B60L 53/122* (2019.01)
*B60L 53/124* (2019.01)
(Continued)

(52) U.S. Cl.
CPC ........... *B60L 53/122* (2019.02); *B60L 53/124* (2019.02); *B60L 53/126* (2019.02); *B60L 53/305* (2019.02); *B60L 53/38* (2019.02)

(58) Field of Classification Search
CPC .... B60L 52/122; B60L 53/126; B60L 53/305; B60L 53/124; B60L 53/38; B60L 53/30
See application file for complete search history.

(56) References Cited

U.S. PATENT DOCUMENTS

| | | | |
|---|---|---|---|
| 11,046,193 | B2 | 6/2021 | Sieber et al. |
| 2015/0355359 | A1 | 12/2015 | Miyashita |

(Continued)

FOREIGN PATENT DOCUMENTS

| | | | |
|---|---|---|---|
| DE | 102016013490 | A1 | 5/2017 |
| DE | 102016226134 | A1 | 6/2018 |

(Continued)

OTHER PUBLICATIONS

English-language translation of International Report on Patentability issued in International Application No. PCT/EP2024/056063 on Sep. 18, 2025.

*Primary Examiner* — Robert L Deberadinis
(74) *Attorney, Agent, or Firm* — Hoffmann & Baron, LLP

(57) ABSTRACT

A vehicle module CPM and/or ground module GPM for an inductive charging system for charging an energy store of a vehicle, wherein energy from the ground module GPM is capable of being inductively transferred to the vehicle module CPM, and the vehicle module CPM and/or the ground module GPM has a number N of electronic assemblies $BG_n$, where n=1, 2, . . . , N and N≥2, each of which comprises a microprocessor module $MPM_n$, an analogue switching circuit module $ASM_n$ and an antenna module AMn, wherein at least two of the assemblies $BG_{n=1}$ and $BG_{n=2}$ have identically structured and configured microprocessor modules $MPM_{n=1}$ and $MPM_{n=2}$, and/or identically structured and configured analog switching circuit modules $ASM_{n=1}$ and $ASM_{n=2}$, and/or identically structured and configured antenna modules $AM_{n=1}$ and $AM_{n=2}$.

10 Claims, 2 Drawing Sheets

(51) Int. Cl.

| | |
|---|---|
| ***B60L 53/126*** | (2019.01) |
| ***B60L 53/30*** | (2019.01) |
| ***B60L 53/38*** | (2019.01) |

(56) References Cited

U.S. PATENT DOCUMENTS

| | | | | |
|---|---|---|---|---|
| 2018/0301933 | A1* | 10/2018 | Lee | H01F 38/14 |
| 2019/0267842 | A1 | 8/2019 | Richter | |

FOREIGN PATENT DOCUMENTS

| | | | |
|---|---|---|---|
| WO | WO 2021/122427 | A1 | 6/2021 |
| WO | WO 2022/000006 | A1 | 1/2022 |
| WO | WO 2023/062085 | A1 | 4/2023 |

* cited by examiner

VEHICLE MODULE AND/OR GROUND MODULE FOR AN INDUCTIVE VEHICLE CHARGING SYSTEM

CROSS REFERENCE TO RELATED APPLICATIONS

The present application is the U.S. National Phase of PCT/EP2024/056063, filed on 7 Mar. 2024, which claims priority to German Patent Application No. 10 2023 105 711.1, filed on 8 Mar. 2023, the entire contents of which are incorporated herein by reference.

BACKGROUND

Field

The invention relates to a vehicle module CPM (English: "Car Pad Module") and/or ground module GPM (English: "Ground Pad Module") for an inductive charging system for charging an energy store of a vehicle, in particular, an electric motor vehicle or a hybrid motor vehicle, wherein energy can be transferred inductively from the ground module GPM to the vehicle module CPM. Furthermore, the invention relates to an inductive charging system for a vehicle for charging an electrical store of the vehicle, with at least one such vehicle module CPM and one such ground module GPM.

Related Art

A variety of inductive vehicle charging systems are known in the prior art, which comprise at least one vehicle module CPM and one ground module GPM and to which reference is made here.

SUMMARY

The object of the invention is to provide a vehicle module CPM and/or a ground module GPM for an inductive charging system for charging an energy store of a vehicle, which is cost-effective to manufacture, reliable in its susceptibility to failure and also easy to maintain.

The invention results from the features of the independent claims. Advantageous refinements and embodiments are the subject matter of the dependent claims. Other features, possible applications, and advantages of the invention will be apparent from the following description and from the discussion of example embodiments of the invention, which are depicted in the drawings.

A first aspect of the invention relates to a vehicle module CPM and/or a ground module GPM for an inductive charging system for charging an energy store of a vehicle, wherein energy from the ground module GPM can be inductively transferred to the vehicle module CPM, and the vehicle module CPM and/or the ground module GPM has a number N of electronic assemblies $BG_n$, where n=1, 2, . . . , N and N≥2, each of which comprises a microprocessor module $MPM_n$, an analog switching circuit module $ASM_n$ and an antenna module $AM_n$.

The vehicle module CPM and/or the ground module GPM is characterized in that at least two of the assemblies $BG_{n=1}$ and $BG_{n=2}$ of the assemblies $BG_n$ have identically structured and configured microprocessor modules $MPM_{n=1}$ and $MPM_{n=2}$ and/or identically structured and configured analog switching circuit modules $ASM_{n=1}$ and $ASM_{n=2}$ and/or identically structured and configured antenna modules $AM_{n=1}$ and $AM_{n=2}$.

The term "identically structured and configured" modules is understood in this case to mean, in particular, that these modules are electronically and mechanically structured in such a way that they can be used in both the one assembly $BG_{n=1}$ and the other assembly $BG_{n=2}$, i.e., they are mutually interchangeable. They thus fulfill all the assigned requirements, functions and tasks for both assemblies $BG_{n=1}$ and $BG_{n=2}$. The term also includes the meaning "physically identical in structure". This means that the affected modules are copies of each other.

On the one hand, these identically structured and configured modules ensure that the manufacturing costs of the vehicle module CPM and/or the ground module GPM can be reduced, as the variety of module types is reduced. At the same time, the susceptibility to errors is reduced by using fewer different module types. Ultimately, maintainability is improved by using a smaller number of module types.

An advantageous further development of the proposed vehicle module CPM and/or the ground module GPM is characterized in that the assemblies $BG_n$ comprise at least two different ones of the following:

- assembly BG of a positioning system/position detection system, in particular, a UWB positioning system, for determining a relative position of the vehicle module CPM relative to the ground module GPM,
- assembly BG of a living object detection LOD (Living Object Detection) for detecting a living object underneath the vehicle and/or in a region between the vehicle module CPM and the ground module GPM,
- assembly BG of a foreign object detection FOD (Doreign Object Detection) in a region between the vehicle module CPM and the ground module GPM,
- assembly BG of a communication system for communication between the vehicle module CPM and the ground module GPM, and
- assembly BG of a communication system for communication between the vehicle module CPM and/or the ground module GPM or an infrastructure communication interface.

The microprocessor modules $MPM_{n=1}$ and $MPM_{n=2}$ and/or the analog switching circuit modules $ASM_{n=1}$ and $ASM_{n=2}$ and/or the antenna modules $AM_{n=1}$ and $AM_{n=2}$ are advantageously each implemented as physically separate modules. The advantage of these modules is that they are easily replaceable mechanically.

Alternatively, the microprocessor modules $MPM_{n=1}$ and $MPM_{n=2}$ and/or the analog switching circuit modules $ASM_{n=1}$ and $ASM_{n=2}$ and/or the antenna modules $AM_{n=1}$ and $AM_{n=2}$ are designed in such a way that they partially share electronic components/electronic component groups of the modules, so that these electronic components/electronic component groups only need to be present once for two modules. This results in the following further developments, for example.

Note: The term "electronic" is understood broadly here. The term is used synonymously with the term "electric". The term "electronic components" comprises all passive or active components used to generate, receive, conduct, process and transmit electrical and/or electromagnetic and/or electro-optical signals. In this case, a component group comprises multiple electronic components.

Advantageously, the antenna modules $AM_{n=1}$ and $AM_{n=2}$ are designed such that they share at least one electronic component, one electronic component group, in particular, at least one (transmitting and/or receiving) antenna.

Advantageously, the analog switching circuit modules $ASM_{n=1}$ and $ASM_{n=2}$ are designed in such a way that they share at least one electronic component group.

Advantageously, the microprocessor modules $MPM_{n=1}$ and $MPM_{n=2}$ are designed such that they share at least one electronic component, one electronic component group and/or, in particular, one processor.

It is advantageous to use a shared electronic component group, for example, an analog or digital circuit, a resonant circuit, an amplifier, an attenuator, a logic circuit or a filter. This list is not exhaustive.

A particularly preferred development of the proposed vehicle module CPM and/or the ground module GPM is characterized in that the microprocessor modules $MPM_{n=1}$ and $MPM_{n=2}$ are physically designed as a single microprocessor module $MPM_{1,2}$, wherein at least one or more or all electronic components of the microprocessor module $MPM_{1,2}$ are shared by both assemblies $BG_{n=1}$ and $BG_{n=2}$. If multiple microprocessor modules $MPM_n$ are present, the two or more or all microprocessor modules $MPM_n$ are preferably designed as a single microprocessor module $MPM_{1,2}$ . . . , wherein at least one or more or all electronic components of the single microprocessor module $MPM_{1,2}$ . . . are used by the two, more or all associated assemblies $BG_n$.

A particularly preferred development of the proposed vehicle module CPM and/or the ground module GPM is characterized in that the analog switching circuit modules $ASM_{n=1}$ and $ASM_{n=2}$ are physically designed as a single analog switching circuit module $ASM_{1,2}$, wherein at least one or more or all electronic components of the analog switching circuit module $ASM_{1,2}$ are shared by both assemblies $BG_{n=1}$ and $BG_{n=2}$. If multiple analog switching circuit modules $ASM_n$ are present, the two or more or all analog switching circuit modules $ASM_n$ are preferably designed as a single analog switching circuit module $ASM_{1,2}$ . . . , wherein at least one or more or all electronic components of the single analog switching circuit module $ASM_{1,2}$ . . . are used by the two, more or all assigned assemblies $BG_n$.

A particularly preferred development of the proposed vehicle module CPM and/or the ground module GPM is characterized in that the antenna modules $AM_{n=1}$ and $AM_{n=2}$ are physically designed as a single antenna module $AM_{1,2}$, wherein at least one or more or all electronic components of the antenna module $AM_{1,2}$ are shared by both assemblies $BG_{n=1}$ and $BG_{n=2}$. If multiple antenna modules $AM_n$ are present, two or more or all antenna modules $AM_n$ are preferably designed as a single antenna module $ASM_{1,2}$ . . . , wherein at least one or more or all electronic components of the single antenna module $ASM_{1,2}$ . . . are used by the two, more or all assigned assemblies $BG_n$.

Advantageously, the module(s) $MPM_{1,2}$ or $MPM_{1,2}$ . . . and/or $ASM_{1,2}$ or $ASM_{1,2}$ . . . and/or $AM_{1,2}$ or $AM_{1,2}$ . . . are each designed as a single, mechanically separately replaceable module.

Furthermore, the invention relates to an inductive charging system for charging an electrical store of the vehicle, with at least one vehicle module CPM and/or a ground module GPM as previously described.

Further advantages, features, and details will be apparent from the following description, in which—optionally with reference to the drawings—at least one example embodiment is described in detail. Identical, similar, and/or functionally identical parts are provided with the same reference numerals.

DETAILED DESCRIPTION

Figure 1:
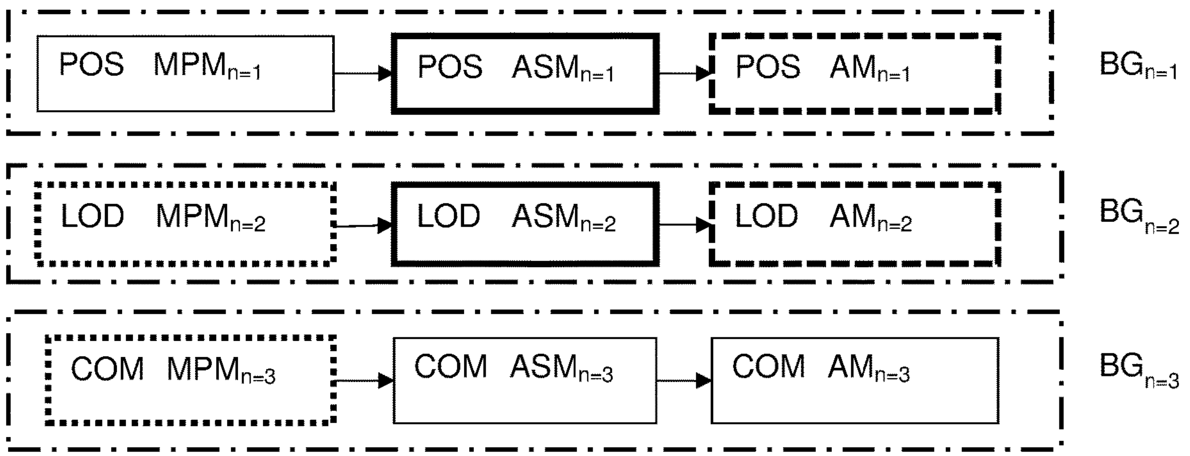
FIG. 1 shows a first embodiment of the invention of three assemblies of a ground module GPM, comprising a position detection system/positioning system (POS): $BG_{n=1}$, a live object recognition system (LOD): $BG_{n=2}$, and a communication system for data transmission between the ground module GPM and the vehicle module CPM (COM): $BG_{n=3}$.
Figure 2:
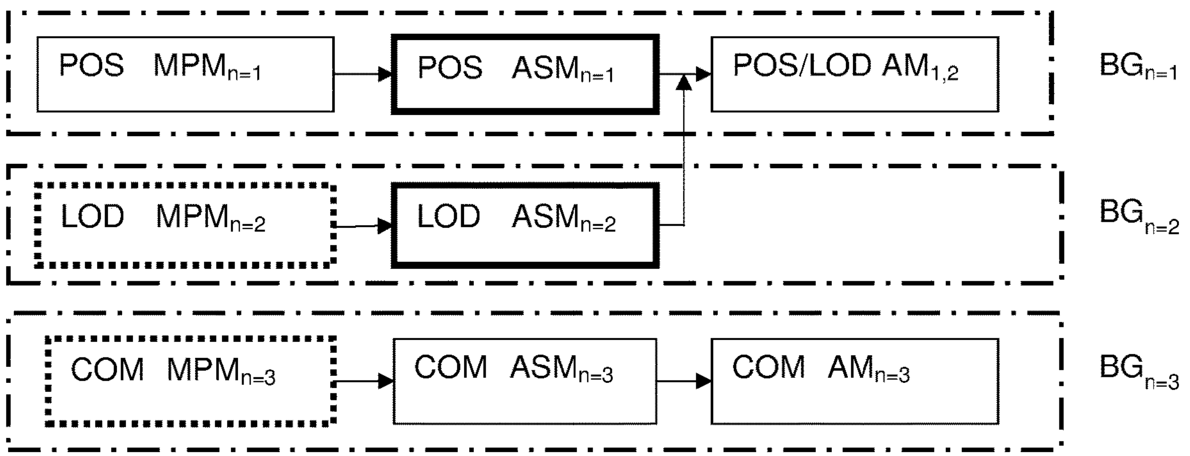
FIG. 2 shows a second embodiment of the invention of three assemblies of a ground module GPM, comprising a position detection system/positioning system (POS): $BG_{n=1}$, a live object recognition system (LOD): $BG_{n=2}$ and a communication system for data transmission between the ground module GPM and the vehicle module CPM (COM): $BG_{n=3}$.
Figure 3:
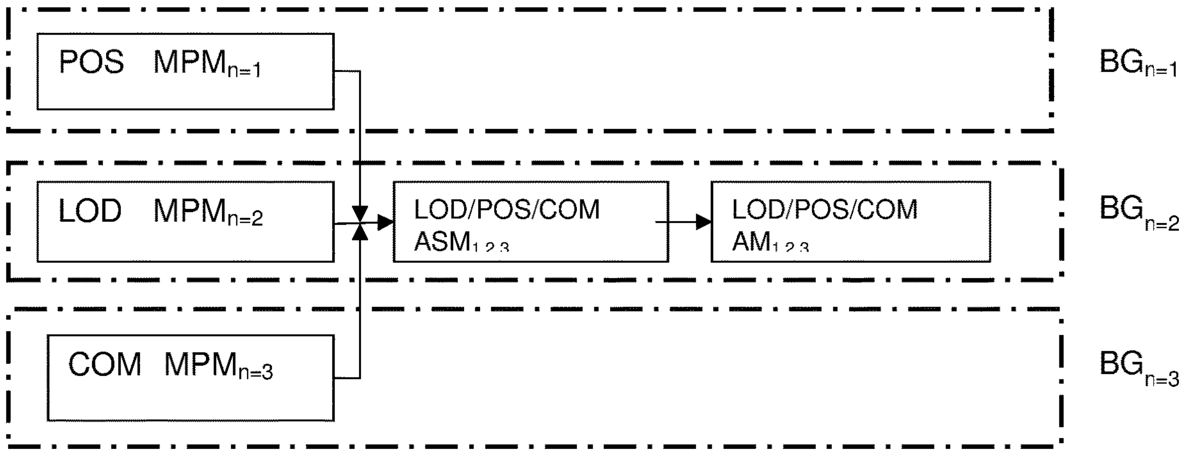
FIG. 3 shows a third embodiment of the invention of three assemblies, for example, of a ground module GPM, comprising a position detection system/positioning system (POS): $BG_{n=1}$, a live object recognition system (LOD): $BG_{n=2}$, and a communication system for data transmission between the ground module GPM and the vehicle module CPM (COM): $BG_{n=3}$.

FIGS. 1 to 3 each show a highly schematic embodiment of a ground module GPM for an inductive charging system for charging an energy store of a vehicle, wherein energy can be transferred inductively from the ground module GPM to a vehicle module CPM arranged in the vehicle.

The ground module GPM respectively comprises the three electronic components:

- a position detection system/positioning system (POS): $BG_{n=1}$,
- a live object detection system (LOD): $BG_{n=2}$, and
- a communication system for data transmission between the ground module GPM and the vehicle module CPM (COM): $BG_{n=3}$.

Further components of the ground module are not shown and are not relevant for the explanation of the present inventive idea.

Each of the three electronic modules mentioned above: $BG_{n=1}$, $BG_{n=2}$, $BG_{n=3}$ each has a microprocessor module $MPM_n$, an analog switching circuit module $ASM_n$ and an antenna module $AM_n$.

FIG. 1 shows a first embodiment of the invention of three assemblies $BG_{n=1}$, $BG_{n=2}$, $BG_{n=3}$ of a ground module GPM, comprising a position detection system/positioning system (POS): $BG_{n=1}$, a live object recognition system (LOD): $BG_{n=2}$ and a communication system for data transmission between the ground module GPM and the vehicle module CPM (COM): $BG_{n=3}$. In this embodiment, the microprocessor modules $MPM_{n=2}$ and $MPM_{n=3}$ of the assemblies $BG_{n=2}$ and $BG_{n=3}$ are identically structured and configured, which is indicated in FIG. 1 by highlighted dots of the associated frames. Furthermore, the analog switching circuit modules $ASM_{n=1}$ and $ASM_{n=2}$ are identically structured and configured, which is indicated in FIG. 1 by an associated frame shown with a thicker line. Finally, the antenna modules $AM_{n=12}$ and $AM_{n=2}$ are identically structured and configured, which is indicated in FIG. 1 by a highlighted dashed line of the associated frames.

The number of module types required to construct a ground module GPM was therefore reduced from 9 to 6 in this example embodiment.

If all microprocessor modules $MPM_{n=2}$, $MPM_{n=2}$, and $MPM_{n=3}$ are structured and configured identically, and all analog switching circuit modules $ASM_{n=1}$, $ASM_{n=2}$, and $ASM_{n=3}$ are structured and configured identically, and all antenna modules $AM_{n=1}$, $AM_{n=2}$, and $AM_{n=3}$ are structured and configured identically, the number of required module types can be reduced to 3.

FIG. 2 shows a second embodiment according to the invention of three assemblies $BG_{n=1}$, $BG_{n=2}$, $BG_{n=3}$ of a ground module GPM, comprising a position detection system/positioning system (POS) $BG_{n=1}$, a live object recognition system (LOD) $BG_{n=2}$ and a communication system for data transmission between the ground module GPM and the vehicle module CPM (COM) $BG_{n=3}$ based on FIG. 1. In this embodiment, in contrast to FIG. 1, the antenna modules $AM_{n=1}$ (POS) and $AM_{n=2}$ (LOD) are physically and mechanically designed as one antenna module $AM_{1,2}$ (POS/LOD), wherein multiple or all of the electronic components of the antenna module $AM_{1,2}$ are shared by the two assemblies $BG_{n=1}$ and $BG_{n=2}$. This reduces the number of modules required in the ground module from 9 to 8.

FIG. 3 shows a third embodiment of the invention of three assemblies $BG_{n=1}$, $BG_{n=2}$, $BG_{n=3}$ of a ground module GPM, comprising a position detection system/positioning system (POS): $BG_{n=1}$, a live object recognition system (LOD): $BG_{n=2}$ and a communication system for data transmission between the ground module GPM and the vehicle module CPM (COM): $BG_{n=3}$. In this embodiment, the antenna modules $AM_{n=1}$ (POS), $AM_{n=2}$ (LOD), and $AM_{n=3}$ (COM) are physically and mechanically designed as one module $AM_{1,2,3}$ (POS/LOD/COM), wherein multiple or all electronic components of the antenna module $AM_{1,2,3}$ are shared by the assemblies $BG_{n=1}$, $BG_{n=2}$, and $BG_{n=3}$. Furthermore, the analog switching circuit modules $ASM_{n=1}$, $ASM_{n=2}$, and $ASM_{n=3}$ are physically and mechanically designed as one module $ASM_{1,2,3}$ (POS/LOD/COM), whereby multiple or all electronic components of the analog switching circuit module $ASM_{1,2,3}$ are shared by the assemblies $BG_{n=1}$, $BG_{n=2}$, and $BG_{n=3}$.

The microprocessor modules $MPM_{n=1}$, $MPM_{n=2}$, and $MPM_{n=3}$ are designed differently in this example embodiment. This reduces the number of modules required in the ground module GPM from 9 to 5.

If the microprocessor modules $MPM_{n=1}$, $MPM_{n=2}$, and $MPM_{n=3}$ are also designed physically and mechanically as a single module $MPM_{1,2,3}$ (POS/LOD/COM) in such a way that multiple or all electronic components of the microprocessor module $MPM_{1,2,3}$ are shared by the assemblies $BG_{n=1}$, $BG_{n=2}$, and $BG_{n=3}$, then the required number of corresponding modules in the GPM can be reduced from 9 to 3.

The statements can be transferred in an analogous manner to corresponding assemblies $BG_n$ in a vehicle module CPM.

Although the invention has been further illustrated and described in detail by way of preferred example embodiments, the invention is not limited by the disclosed examples, and other variations can be derived therefrom by a person skilled in the art without departing from the scope of the invention. It is therefore clear that a variety of possible variations exists. It is also clear that exemplified embodiments are really only examples, which are not to be construed in any way as limiting the scope, applicability, or configuration of the invention. Rather, the foregoing description and description of the figures enable a person skilled in the art to implement the example embodiments, and such person may make various changes knowing the disclosed inventive concept, for example with respect to the function or arrangement of individual elements cited in an example embodiment, without departing from the scope as defined by the claims and their legal equivalents, such as a more extensive explanation in the description.

The invention claimed is:

1. A vehicle module CPM and/or a ground module GPM for an inductive charging system for charging an energy store of a vehicle, wherein energy from the ground module GPM is capable of being inductively transferred to the vehicle module CPM, and the vehicle module CPM and/or the ground module GPM has a number N of electronic assemblies $BG_n$, where n=1, 2, . . . , N and N≥2, each of which comprises a microprocessor module $MPM_n$, an analog switching circuit module $ASM_n$ and an antenna module $AM_n$, wherein:

the assemblies $BG_n$ comprise at least two different assemblies $BG_{n=1}$ and $BG_{n=2}$ of the following:

assembly BG of a positioning system for determining a relative position of the vehicle module CPM relative to the ground module GPM, assembly BG of a living object detection for detecting a living object underneath the vehicle and/or in a region between the vehicle module CPM and the ground module GPM, assembly BG of a foreign body detection in a region between the vehicle module CPM and the ground module GPM, assembly BG of a communication system for communication between the vehicle module CPM and the ground module GPM, assembly BG of a communication system for communication between the vehicle module CPM and/or the ground module GPM or an infrastructure communication interface; and the at least two different assemblies $BG_{n=1}$ and $BG_{n=2}$ of the assemblies $BG_n$ have identically structured and configured antenna modules $AM_{n=1}$ and $AM_{n=2}$, wherein the antenna modules $AM_{n=1}$ and $AM_{n=2}$ share at least one electronic component or electronic assembly.

2. The vehicle module CPM and/or ground module GPM according to claim 1, wherein the at least two different assemblies $BG_{n=1}$ and $BG_{n=2}$ have identically structured and configured microprocessor modules $MPM_{n=1}$ and $MPM_{n=2}$ and/or identically structured and configured analog switching circuit modules $ASM_{n=1}$ and $ASM_{n=2}$.

3. The vehicle module CPM and/or ground module GPM according to claim 2, wherein the microprocessor modules $MPM_{n=1}$ and $MPM_{n=2}$ and/or the analog switching circuit modules $ASM_{n=1}$ and $ASM_{n=2}$ and/or the antenna modules $AM_{n=1}$ and $AM_{n=2}$ of the at least two different assemblies $BG_{n=1}$ and $BG_{n=2}$ are each designed as a single, mechanically separately replaceable module $MPM_{1,2}$, $ASM_{1,2}$, $AM_{1,2}$.

4. The vehicle module CPM and/or ground module GPM according to claim 2, wherein the analog switching circuit modules $ASM_{n=1}$ and $ASM_{n=2}$ of the at least two different assemblies $BG_{n=1}$ and $BG_{n=2}$ share at least one electronic component or electronic assembly.

5. The vehicle module CPM and/or ground module GPM according to claim 2, wherein the microprocessor modules $MPM_{n=1}$ and $MPM_{n=2}$ of the at least two different assemblies $BG_{n=1}$ and $BG_{n=2}$ share at least one electronic component or electronic assembly.

6. The vehicle module CPM and/or ground module GPM according to claim 5, wherein the shared at least one electronic component or electronic assembly is a processor.

7. The vehicle module CPM and/or ground module GPM according to claim 1, wherein the shared at least one electronic component or electronic assembly is an analog or digital circuit, a resonant circuit, an amplifier, an attenuator, a logic circuit, or a filter.

8. The vehicle module CPM and/or ground module GPM according to claim 1, wherein the positioning system is an ultra-wideband UWB positioning system.

9. The vehicle module CPM and/or ground module GPM according to claim 1, wherein the shared at least one electronic component or electronic assembly is an antenna.

10. An inductive charging system for charging an energy store of a vehicle, comprising at least one vehicle module CPM and one ground module GPM according to claim 1.

* * * * *